US012749907B2

(12) United States Patent
Falkenberg

(10) Patent No.: US 12,749,907 B2
(45) Date of Patent: Sep. 29, 2026

(54) PPLUG-IN MOBILE PHONE CASE

(71) Applicant: Marc Falkenberg, Wilmette, IL (US)

(72) Inventor: Marc Falkenberg, Wilmette, IL (US)

( * ) Notice: Subject to any disclaimer, the term of this patent is extended or adjusted under 35 U.S.C. 154(b) by 661 days.

(21) Appl. No.: 18/083,734

(22) Filed: Dec. 19, 2022

(65) Prior Publication Data

US 2023/0307933 A1 Sep. 28, 2023

Related U.S. Application Data

(60) Provisional application No. 63/318,162, filed on Mar. 9, 2022.

(51) Int. Cl.
*H02J 7/00* (2006.01)
*G06F 1/16* (2006.01)

(52) U.S. Cl.
CPC .......... *H02J 7/0045* (2013.01); *G06F 1/1656* (2013.01)

(58) Field of Classification Search
CPC ............................. H02J 7/0045; G06F 1/1656
See application file for complete search history.

(56) References Cited

U.S. PATENT DOCUMENTS

| | | | |
|---|---|---|---|
| 9,130,384 B2 | 9/2015 | Pliner et al. | |
| 9,544,005 B2 | 1/2017 | Wei | |
| 2003/0218445 A1 | 11/2003 | Behar | |
| 2012/0319487 A1 | 12/2012 | Shah | |
| 2013/0052871 A1 | 2/2013 | Eklind | |
| 2014/0035511 A1* | 2/2014 | Ferber | H02J 7/0042 320/103 |

FOREIGN PATENT DOCUMENTS

| | | |
|---|---|---|
| CN | 2403134 | 10/2000 |
| CN | 102098365 | 6/2011 |

(Continued)

OTHER PUBLICATIONS

Mobile Phone With Inbuilt Charger, https://nif.org.in/innovation/mobile-phone-with-inbuilt-charger/680, K. Karan Kumar & Siddharthanan K.

(Continued)

*Primary Examiner* — Carlos Amaya
(74) *Attorney, Agent, or Firm* — The Law Offices of Konrad Sherinian LLC; Depeng Bi

(57) ABSTRACT

A charging case for a smartphone, also serving as a protective case for full-time use of the housed smartphone, adding no more than about 1 millimeter of thickness to the phone. The charging case includes an integral flip-out (pivotal) input AC power plug, charging electronic circuitry, and an output DC charging plug connector corresponding to a DC charging socket of the housed smartphone. The charging case includes a phone compartment operative to guide the DC plug connector into the smartphone's charging socket as the smartphone is inserted into the phone compartment, and to maintain that inserted connection while the smartphone is held in the compartment. The case also includes its own integral DC socket to allow for charging the housed and connected smartphone through an external charging system and/or data transfer to and from the smartphone. Apertures in the case allow for unimpeded use and functionality of the housed smartphone.

12 Claims, 3 Drawing Sheets

(56) References Cited

FOREIGN PATENT DOCUMENTS

| | | |
|---|---|---|
| CN | 201985912 | 9/2011 |
| CN | 201994978 | 9/2011 |
| CN | 202019380 | 10/2011 |
| CN | 202535411 | 11/2012 |
| CN | 202535433 | 11/2012 |
| CN | 202587082 | 12/2012 |
| CN | 202713424 | 1/2013 |
| CN | 202713425 | 1/2013 |
| CN | 202841236 | 3/2013 |
| CN | 203268672 | 11/2013 |
| CN | 103840505 | 6/2014 |
| CN | 103253453 | 9/2015 |
| CN | 106329683 | 1/2017 |
| CN | 106878517 | 6/2017 |
| CN | 108494927 | 7/2019 |
| KR | 2006009111 | 1/2006 |
| KR | 2016085533 | 7/2016 |
| KR | 2018003942 | 1/2018 |
| WO | 2012174573 | 12/2012 |

OTHER PUBLICATIONS

Infinitely Charged built-in cell phone charger, https://newatlas.com/infinitely-charged-built-in-cell-phone-charger/8778/, Noel McKeegan, Feb. 7, 2008.

JuiceTank iPhone cover integrates collapsible wall charger, By Jonathan Fincher, Mar. 20, 2012, https://newatlas.com/juicetank-iphone-charger/21862/.

Prong's PWR case for iPhone 5/5s features a detachable battery pack with an integrated plug, Dom Esposito, Apr. 24, 2014 12:11 pm PT, @macmixing, https://9to5mac.com/2014/04/24/prongs-pwr-case-for-iphone-55s-features-a-detachable-battery-pack-with-an-integrated-plug/.

* cited by examiner

PPLUG-IN MOBILE PHONE CASE

CROSS REFERENCE TO RELATED APPLICATIONS

This application claims the priority benefit of U.S. Provisional Application No. 63/318,162, filed Mar. 9, 2022, entitled "Plug-in Mobile Phone," which is hereby incorporated by reference in its entirety.

FIELD OF THE DISCLOSURE

The present invention generally relates to cases for mobile phones, and more particularly it relates to a mobile phone charging case with an integrated charging system.

DESCRIPTION OF BACKGROUND

Typical existing mobile phone charging systems often constitute a separate plug-in AC to DC charging adapter and a cable that connects the adapter to the phone, both of which are easy to misplace and cumbersome to carry, for example, when traveling. It has been ubiquitous for some time for smartphone users to keep their smartphones in protective cases, such as those commercially identified by the brand names and marks Otterbox, Spigen, Urban Armor Gear, Speck, Ringke, Incipio, Ballistic, Case-Mate, Element, and many others. However, most existing smartphone cases do not have built-in charging systems, and a very few that do tend to be overly bulky and/or to interfere with one or more functions of the housed smartphone. A need therefore exists for a mobile phone charging case that is compact and allows for unencumbered functionality of a typical smartphone.

SUMMARY OF THE DISCLOSURE

According to an aspect of the disclosure, a charging case for a smartphone with a DC charging socket is provided. The charging case comprises a housing, an AC power plug, charging circuitry, low-current wiring, a DC plug connector, and a DC socket.

The housing has rear, front, top, bottom, left and right sides, and dimensions, the housing dimensions being a depth dimension extending from a rear end on the rear side to a front end on the front side, a height dimension extending from a bottom end on the bottom side to a top end on the top side, and a width dimension extending from a left end on the left side to a right end on the right side. The housing comprises a rear panel, a sidewall structure, a phone compartment, and circuitry compartment. The rear panel is disposed on the rear side, and the sidewall structure is connected to the rear panel at a peripheral region of the rear panel, the sidewall structure extending forwardly from the rear panel to the front side. The sidewall structure comprises top and bottom portions and left and right lateral portions extending peripherally along respective portions of the rear panel perimeter on each of the left, bottom, right, and top sides of the housing. The phone compartment comprises at least a portion of the rear panel and at least a portion of each of the left, bottom, and right portions of the sidewall structure. The phone compartment forms a phone cavity, the phone cavity being entirely disposed in front of the rear panel and within the dimensions of the housing. The circuitry compartment comprises at least a portion of the rear panel and at least a portion of each of the left, top and right portions of the sidewall structure and has an enclosed volume entirely disposed above the phone cavity and within the dimensions of the housing.

The AC power plug comprises a pair of AC prongs, the AC prongs being movably connected to the housing so as to be movable to and from a retracted position and an extended position. The AC prongs in the retracted position are disposed within the dimensions of the housing, and the AC prongs in the extended position extend beyond at least one dimension of the housing to permit the AC prongs be plugged into an AC electric socket energized by an AC power grid.

The charging circuitry is disposed within the enclosed volume of the circuitry compartment. The charging circuitry comprises an AC input terminal and a DC output terminal. The AC prongs are operatively connected to the AC input terminal so that when the AC prongs are plugged into the AC electric socket, AC grid power is delivered from the AC power grid through the AC prongs to the AC input terminal. The charging case charging circuitry is operative to be energized when the AC grid power is delivered to the AC input terminal, and when so energized, to output an internal DC charging current to the DC output terminal. The internal DC charging current is at a lower voltage than the AC grid power. The charging case DC plug connector is mounted to the sidewall structure and extends into the phone cavity. The low-current DC wiring operatively connects the charging case charging circuitry DC output terminal to the charging case DC plug connector. The charging case DC socket is mounted to the housing so as to permit an external DC plug connector of an external charging system for the smartphone to be inserted into the charging case DC socket from the exterior of the housing, the charging case DC socket being operatively connected to the charging case DC plug connector, so that when the external DC plug connector is plugged into the charging case DC socket and the external charging system is energized so as to deliver an external DC charging current to the external DC plug connector, the charging case DC socket transmits the external DC charging current from the external DC plug connector to the charging case DC plug connector.

The phone compartment is operative to permit assembling the smartphone to the charging case by manually inserting the smartphone into the phone cavity in such a manner that the charging case DC plug connector is inserted into and operatively connected to the smartphone DC charging socket. When the smartphone is so assembled to the charging case, the phone compartment is operative to hold the smartphone in the phone cavity so as to keep the charging case DC plug connector operatively connected to the smartphone DC charging socket, so that, when the internal DC charging current is delivered to the charging case DC plug connector, the internal DC charging current is transmitted from the charging case DC plug connector to the smartphone DC charging socket; and when the external DC charging current is delivered to the charging case DC plug connector, the external DC charging current is transmitted from the charging case DC plug connector to the smartphone DC charging socket.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

Figure 1:
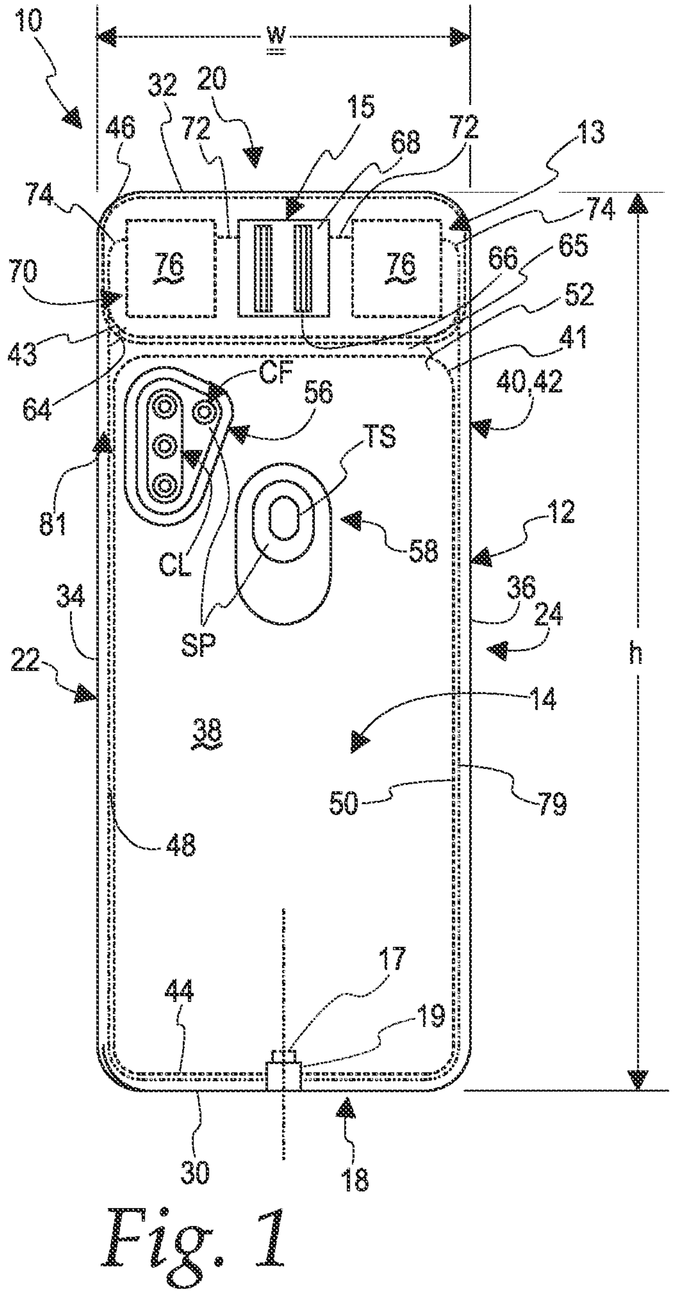
FIG. 1 is a rear side plan view of a charging case according to an embodiment of the disclosure.

A person of ordinary skill in the art will appreciate that elements of the figures above are illustrated for simplicity and clarity and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

In the following description of various examples of embodiments of the disclosed systems and methods, reference is made to the accompanying drawings, which form a part hereof, and in which are shown by way of illustration various example devices, systems, and environments in which aspects of the disclosed systems and methods can be practiced. Other specific arrangements of parts, example devices, systems, and environments, can be used, and structural modifications and functional modifications can be made without departing from the scope of the disclosed systems and methods.

Described here and illustrated in the accompanying drawings are a protective housing and multimode-charging smartphone case and methods of its use. As will be appreciated from the present disclosure, the charging case houses and protects a smartphone while providing several additional benefits, including a plug-in integrated charging system with a flip-out AC power plug that eliminates the need to carry a separate charger, a DC input socket that enables both charging and data transfer to and from a smartphone housed in the charging case, unimpeded functionality of the smartphone for continued everyday use while housed in the charging case, and a slim overall depth of the assembled smartphone and charging case for convenient holding and carrying. In embodiments, the depth of the disclosed charging case and smartphone assembly is similar to that of an assembly of the same smartphone and a typical basic protective case without integrated charging. In preferred embodiments, a depth of the case extends rearwardly of the housed smartphone by no more than a rear panel thickness typical of such known basic protective smartphone cases, and forwardly of the housed smartphone by no more than the forward extent of a retention lip or flange typical of such known basic protective smartphone cases, of a type that slightly overlaps a peripheral border of a front face of the smartphone.

In particular preferred embodiments, the assembly depth extends rearwardly and forwardly from the housed smartphone by respective forward and rearward depth portions, neither depth portion exceeding 4 mm (approximately 0.157 inch), more particularly neither exceeding 2 mm (approximately 0.0787 inch), still more particularly neither exceeding about 1 mm (about 0.04 inch), the sum of the depth portions being no greater than 8 mm (approximately 0.315 inch), more particularly no greater than 4 mm (approximately 0.157 inch), still more particularly no greater than about 2 mm (about 0.08 inch), still more particularly no greater than about 1.8 mm (about 0.07 inch). In addition, in particular preferred embodiments a total depth dimension of the case is no greater than about 15 mm (about 0.59 inch), more preferably no greater than about 13 mm (about 0.51 inch), and still more preferably no greater than about 11 mm (about 0.43 inch).

For purposes of measuring such a forward depth portion, the forward depth portion can refer to a forward distance from a forwardmost region of the smartphone (e.g., a screen area) to a forwardmost region of the case. Such a forwardmost region of the case can constitute a peripheral edge or surface that circumscribes a screen area of the housed smartphone. More particularly, the case can have such a peripheral edge or surface disposed at a uniform or substantially uniform forward distance from the screen area. For purposes of measuring such a rearward depth portion, the rearward depth portion can be defined either as an average rearward distance or a maximum rearward distance from a rearmost extent of the housed smartphone (e.g.; a flat or substantially flat rear surface of the smartphone housing or body) to points on a rear side of the case. Where the rearmost extent is defined as such an average rearward distance, such a maximum rearward distance preferably exceeds the average rearward distance by no more than about 5 mm. Still more preferably, such a maximum rearward distance occurs only over a region of the case disposed within a contiguous portion of the case extending over no more than 25%, and still more preferably no more than 10%, of an overall height dimension of the case. In other preferred embodiments, a maximum rearward distance from a rearmost extent of the housed smartphone to points on the rear side of the case exceeds such an average rearward distance by no more than about 1 mm over a contiguous portion of the case extending over at least 75%, and still more preferably at least 90%, of an overall height dimension of the case.

Figure 3A:
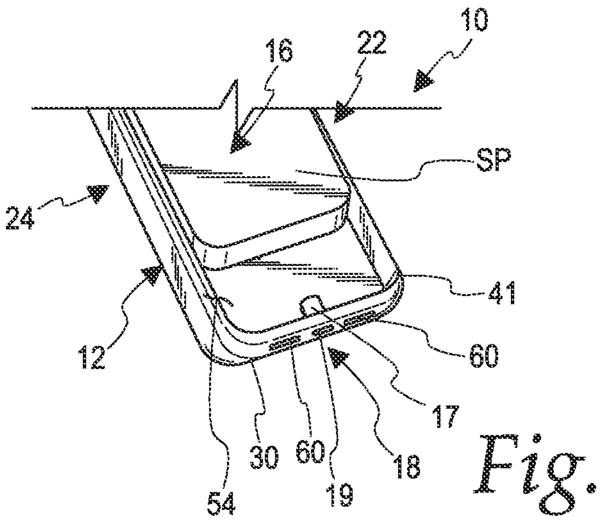
FIG. 3A is a bottom-front-right truncated perspective view of a lower portion of the charging case shown in FIG. 1, showing a smartphone partially inserted into the case according to a method of use.

Turning to FIG. 1, there is shown a rear plan view of a multimodal charging case 10 for a smartphone SP as described herein. It will be appreciated that the charging case 10 also serves as a full-time housing and protective case for the smartphone SP. The charging case 10 includes a housing 12, an electronic circuit 13 and connectors operatively connected to terminals of the circuit 13. The connectors include a flip-out, input AC power plug 15, an output charging case DC plug connector 17 (position indicated in broken lines in FIG. 1, visible in FIG. 3A) for connection to a smartphone DC charging socket, and an input charging case DC socket 19.

The housing 12 has a rear side 14 (best seen in FIGS. 1, 5, and 6), a front side 16 (best seen in FIGS. 2-4), a bottom side 18, a top side 20, a left side 22, and a right side 24. As illustrated in the planar views of FIG. 1 and FIG. 2, the housing 12 has a depth dimension d (FIG. 2 only) extending from a rear end 26 on the rear side 14 to a front end 28 on the front side 16, a height dimension h extending from a bottom end 30 on the bottom side 18 to a top end 32 on the top side 20, and a width dimension w extending from a left end 34 on the left side 22 on the left side 22 to a right end 36 on the right side 24. The housing 12 includes a rear panel 38, a sidewall structure 40, a phone compartment 41, and a circuitry compartment 43. The rear panel 38 is disposed at the rear side 14 of the housing 12, and the sidewall structure 40, phone compartment 41 and circuitry compartment 43 are connected to and extend forwardly from the rear panel 38. The rear side of the rear panel 38 is flat, or at least substantially flat, over an entire central and generally rearmost region of its area. "Substantially flat" will be understood to allow for small variations in thickness normally found in known smartphone case housings, including those of embossed or engraved logo designs or grip features such as dimples/bumps or ribs/grooves, for example approximately 1/64 inch to 1/32 inch in depth, or slightly larger protrusions (not shown), for example no greater than 1/8 inch, occurring only within a relatively small region of an overall rear plan view area of the rear side of the rear panel 38, such as approximately 0-10% of the rear plan view area. As illustrated, the housing 12 also has a curved border/transition region that joins the central region of the rear panel 38 to the outer surface(s) of the sidewall structure 40. As illustrated, the central region of the rear panel 38 is flat, and the housing 12 has a depth dimension d measured from this flat central region to the front end 28, as seen in the elevation view of FIG. 2.

More particularly, the sidewall structure 40 is connected to the rear panel 38 at a peripheral region 42 of the rear panel 38 and extends forwardly from the rear panel 38 to the front side 16. The sidewall structure 40 comprises a bottom sidewall structure portion 44, a top sidewall structure portion 46, a left lateral sidewall structure portion 48, and a right lateral sidewall structure portion 50, the bottom, top, left and right sidewall structure portions 44, 46, 48, 50 extending peripherally along portions of the rear panel peripheral region 42 on each of the respective bottom, top, left and right sides 18, 20, 22, 24 of the housing.

The phone compartment 41 comprises at least a portion of the rear panel 38 and at least portions of the sidewall structure 40. More particularly, the phone compartment 41 comprises at least a portion of each of the bottom, left and right portions 44, 48, 50 of the sidewall structure. The phone compartment 41 forms a phone cavity 52, the phone cavity 52 being entirely disposed in front of the rear panel 38 and within the dimensions of the housing 12. More particularly, the phone cavity 52 has a screen opening 54 (best seen in FIGS. 3 and 4) on its front side and is at least substantially enclosed by the phone compartment 41 on its rear, bottom, top, left and right sides.

Figure 4:
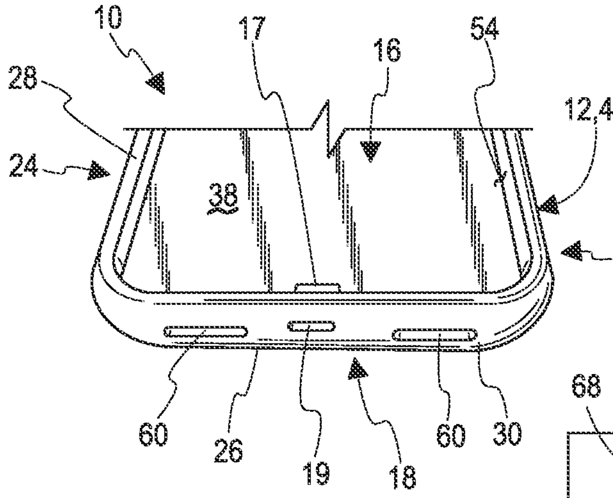
FIG. 4 is a bottom-front truncated perspective view of a lower portion of the charging case shown in FIG. 1.

As best seen in FIGS. 1 and 4, one or more apertures are formed in the phone compartment 41 to permit access to and/or facilitate the function of one or more smartphone components. Still more particularly, the smartphone SP represents a specific model of smartphone, and the dimensions of the phone compartment 41 and the sizes and positions of such apertures are customized to fit the specific model of the smartphone SP. In the illustrated example, the phone compartment 41 has a camera aperture 56 and a touch/fingerprint sensor aperture 58 formed in its rear side (more particularly in the rear panel 38), as well as two speaker/microphone apertures 60 formed on its bottom side (more particularly in the sidewall structure bottom portion 44). Each aperture 56, 58, 60 comprises a hole extending through a wall thickness of the phone compartment 41 and over an area positioned and sized to align with a functional area of the corresponding feature of the smartphone. Thus, the camera aperture 56 is so positioned and just large enough not to interfere with camera components, illustrated as camera lenses CL and a camera flash CF, the touch sensor aperture 58 is so positioned and just large enough to expose the full area of a corresponding touch sensor, and the speaker/microphone apertures 60 are so positioned and just large enough to expose the area of speaker and microphone grilles of the smartphone SP when the smartphone SP is so assembled to the charging case 10 and disposed in the phone cavity 52. In view of the above-described features, it will be appreciated that the charging case 10 is adapted and configured not only to facilitate charging, but also to accommodate all modes of normal use while continuously housing and protecting the smartphone SP.

The circuitry compartment 43 comprises at least a portion of the rear panel 38 and at least a portion of each of the top, left and right portions 46, 48, 50 of the sidewall structure 40. The circuitry compartment 43 has an enclosed circuitry volume 64 entirely disposed above the phone cavity 52 and within the dimensions of the housing 12. More particularly, the enclosed circuitry volume 64 is at least substantially enclosed on all sides by the circuitry compartment 43. More particularly, the circuitry volume 64 is enclosed on a rear side by the rear panel 38, on a top side by the sidewall structure top portion 46, on a left side by the sidewall structure left portion 48, and on a right side by the sidewall structure right portion 50. In addition, the housing 12 further comprises a divider wall 65, where indicated in FIG. 1, which encloses the circuitry volume 64 on a bottom side. The divider wall 65 is connected to and extends forwardly from the rear panel 38, and it is disposed above the phone cavity 52 and below the circuitry volume 64.

Figure 2:
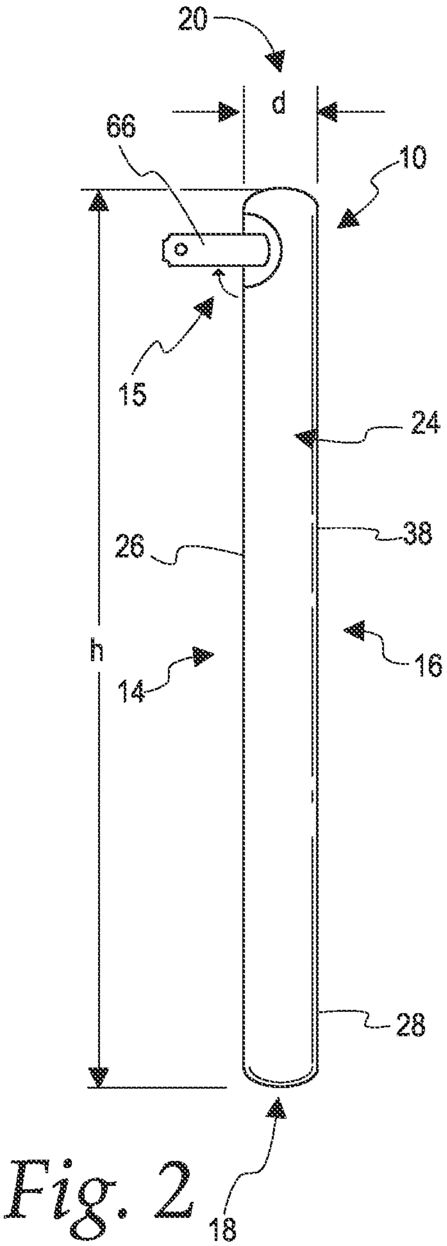
FIG. 2 is a right side elevation view of the charging case shown in FIG. 1.
Figure 5:
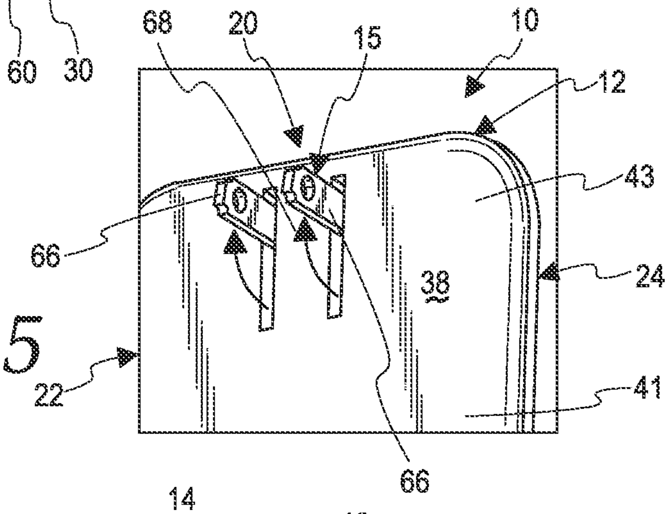
FIG. 5 is a bottom-rear-right truncated perspective view of an upper portion of the charging case shown in FIG. 1, showing an AC power plug in an extended position.

The AC power plug 15 comprises a pair of AC prongs 66 that are movably connected to the housing 12 so as to be movable to and from a retracted position for normal use of the housed smartphone, as illustrated in FIG. 1, and an extended position exposing the prongs 66 for charging, as illustrated in FIGS. 2 and 5. The AC prongs 66 in the retracted position are disposed within the dimensions of the housing 12, and the AC prongs in the extended position extend in a plugging direction beyond at least one dimension of the housing 12 to permit the AC prongs be plugged into an AC electric socket energized by an AC power grid. More particularly, in embodiments including the illustrated embodiment, the AC prongs 66 are pivotally connected to a pivotal base 68 so as to be pivotable to and from the retracted position and the extended position, the pivotal base 68 being disposed at one of the sides of the housing 12 so that the prongs 66 have a pivotal axis parallel to the side of the housing 12, with the AC prongs 66 in the retracted position extending away from the pivotal axis towards an opposite side of the housing 12. More particularly, the pivotal base 68 is illustrated as being disposed at the top side 20 of the housing 12, with the retracted prongs 66 extending away from the pivotal axis towards the bottom side 18. In the extended position, the AC prongs 66 of the illustrated embodiment extend rearwardly away from the pivotal axis beyond a rearmost extent of the housing 12, for plugging in the charging case 10 with its rear side 14 parallel to a facing of the AC electric socket, and more particularly in the case of a typical wall outlet, generally flush against a wall.

In other embodiments not shown, AC prongs are connected to a pivotal base so as to be pivotable beyond 90° by as much as 180°, and even by as much as 270°, from their retracted position to any of a plurality of extended positions at a continuously variable range of angles from the retracted position, such as extended positions anywhere between 90° and 270° from the retracted position, and thus to permit a charging case to be plugged in with the front and rear sides of its housing inclined at any of a continuously variable range of angles from a socket facing, such as from about 0° to about 180°. The plurality of extended positions of the AC prongs can include extended positions in which the prongs extend away from their pivotal axis outwardly beyond a frontal profile area of a housing, such as upwardly beyond its height dimension (i.e., upwardly beyond its top side) in the case of a pivotal axis being positioned at the top side of a charging case housing.

Figure 6:
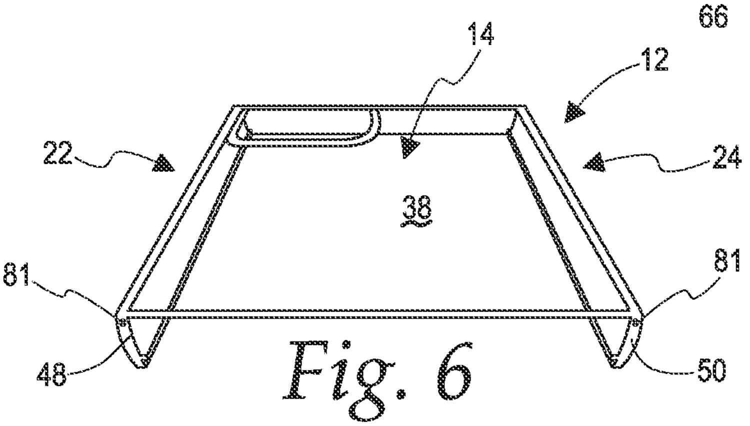
FIG. 6 is a bottom-rear cross-sectional view of an upper portion of a housing of the charging case shown in FIG. 1.

The circuit 13 of the charging case 10 and its associated connectors 15, 17, and 19 will now be described in greater detail, with reference to the views of FIGS. 1 and 6. The circuit 13 includes charging circuitry 70 disposed within the enclosed volume 64 of the circuitry compartment 43. The charging circuitry 70 comprises an AC input terminal 72, a DC output terminal 74, and one or more AC-DC converter components 76. The AC prongs 66 of the AC power plug 15 are operatively connected to the AC input terminal 72, so that when the AC prongs 66 are plugged into an AC electric socket, AC grid power is delivered from the AC power grid through the AC prongs 66 to the AC input terminal 72. The charging case charging circuitry 70, and specifically the AC-DC converter components 76, are operative to be energized when the AC grid power is delivered to the AC input terminal 72, and when so energized, to output an internal DC charging current to the DC output terminal 74, the internal DC charging current being at a lower voltage than the input AC grid power. For example, the AC grid power can be delivered at a standard voltage, such as in the range of 110-120V or 220-240V, and the DC charging current can be delivered, for example, at a voltage in the range of 5-12V and an amperage in the range of 0.5 A to about 3.0 A. The AC-DC converter components 76 can be constructed according to known methods so as to operate in accordance with this disclosure, and they can comprise a plurality of sub-components including, for example, a voltage transformer to step down voltage, a rectifier, a voltage regulator, and one or more resistors and/or capacitors.

Operatively connected to the DC output terminal 74 is the charging case DC plug connector 17, the DC plug connector 17 being mounted to the sidewall structure 40 so as to extend into the phone cavity 52 to be inserted into a corresponding DC charging and data transfer socket (when also referred to herein for brevity as simply a "DC charging socket," there is no intention to exclude data transfer capability) of the smartphone SP when the latter is inserted into the phone compartment 41. The DC plug connector 17 is of a type compatible with the DC charging and data transfer socket of the smartphone SP, such as, for example, a microUSB connector, a USB-C connector, or Apple's proprietary Lightning connector. Low-current DC wiring 79 of the circuit 13 is operatively connected between the DC output terminal 74 and the charging case DC plug connector 17 so at to deliver the internal DC charging current to the DC plug connector 17. More particularly, the wiring 79 is disposed in at least one wiring channel 81 formed in the sidewall structure 40, as best seen in FIG. 6 in a cross-sectional bottom-rear perspective view of the housing 12 cut through the left and right portions 48 and 50 of the sidewall structure 40 and a portion of the rear panel 38. As illustrated in phantom lines in FIG. 1, the wiring channel 81 extends from the charging case DC plug connector 17, within an interior of the sidewall structure bottom portion 44 to an interior of one of the right and left sidewall structure lateral portions 48, 50, and through the interior of the sidewall structure lateral portion 48, 50 to the circuitry compartment 43, the low-voltage DC wiring 79 extending from the charging case charging circuitry DC output terminal 74 through the wiring channel 81 to the charging case DC plug connector 17.

In addition, the phone compartment 41 is operative to permit assembling the smartphone SP to the charging case 10 by manually inserting the smartphone SP into the phone cavity 52 in such a manner that the charging case DC plug connector 17 is inserted into and operatively connected to the DC charging socket of the smartphone SP, and to hold the inserted smartphone SP in the phone compartment 41 so as to maintain this connection. More particularly, the phone compartment 41 is operative to receive a lower end of a smartphone SP inserted generally straight downwardly toward the lower end 18 of the charging case, so as insert the plug connector 17 into the smartphone's DC charging socket, as shown in the truncated view of FIG. 3A.

Figure 3B:
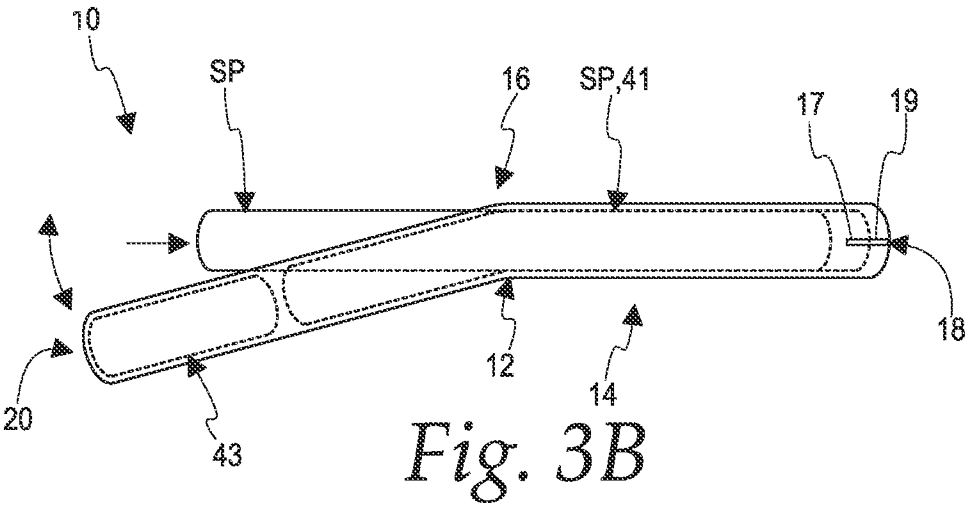
FIG. 3B is a right-side elevation view of a smartphone being inserted into the charging case of FIG. 1 according to a method of use.

As illustrated in FIG. 3B, to facilitate such insertion, a middle portion of the length of the housing 12 can be somewhat flexible so as to allow a more rigid upper portion of the housing 12 comprising the circuitry compartment 43 to be deflected clear of a straight downward insertion pathway of a smartphone SP into a lower portion of the housing 12. After the plug connector 17 is inserted, the housing 12 can be returned to a straight orientation so as to enclose a periphery of the smartphone SP within the phone compartment 41.

Figure 3C:
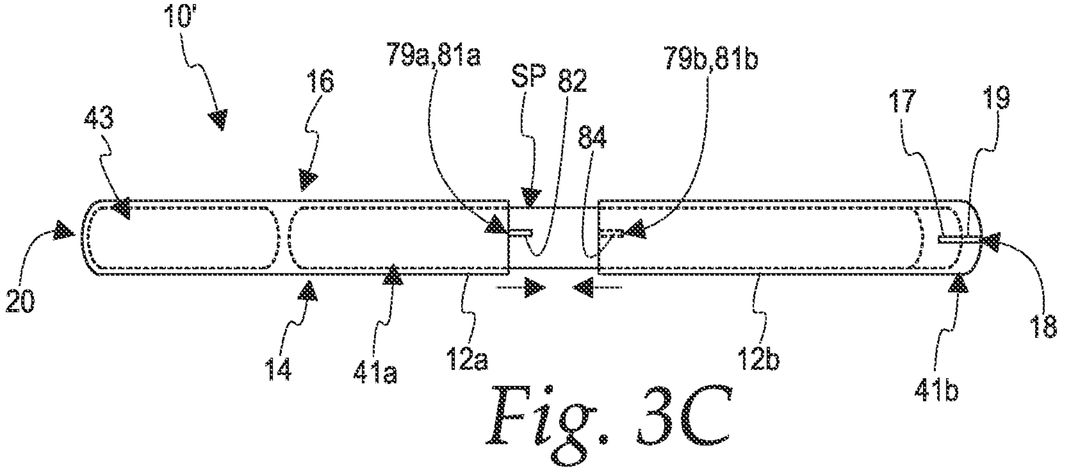
FIG. 3C is a right-side elevation view of a two-piece embodiment of a charging case being assembled so as to receive and house a smartphone according to another method of use.

In another embodiment of a charging case 10' shown in FIG. 3C, a housing is divided into separably connected sections as an upper housing section **12*a*, comprising an upper phone compartment section 41*a*, and a lower housing section 12*b*, comprising a lower phone compartment section 41*b*. When the two housing sections 12*a* and 12*b* are separated as shown, with an upper portion of the smartphone SP inserted into the upper phone compartment section 41*a* and a lower portion inserted into the lower phone compartment 41*b*, the housing sections 12*a*, 12*b* can be moved together along a straight vertical path as indicated by the opposed arrows in the drawing, so as to securely enclose the smartphone SP in a phone compartment analogous to the phone compartment 41 of the charging case 10, comprised of the two sections 41*a*, 41*b* joined together. In this embodiment, low current wiring analogous to the low current wiring 79 of the charging case 10 is divided into an upper wiring portion 79*a* a lower wiring portion 79*b*, which extend through respective upper and lower wiring channel sections 81*a* and 81*b* formed in the respective upper and lower housing sections 12*a*, 12*b* analogously to portions of the wiring channel 81 of the charging case 10. The upper and lower wiring portions 79*a*, 79*b* are operatively connected so as to complete a circuit of the charging case 10' (analogous to the circuit 13 of the charging case 10) by inserting a plug connector 82** that is mounted to the upper housing section 12*a* into a socket connector 84 that is mounted to the lower housing section 12*b* as the housing sections 12*a*, 12*b* are brought together.

In other embodiments not shown, rather than being fully separable, an upper housing section and a lower housing section analogous to the upper and lower housing sections 12*a*, 12*b* can be permanently connected by a sliding joint, which permits upper and lower sections of a phone compartment to be moved apart vertically to provide clearance for a smartphone to be positioned between an upper end of the upper section and a charging case DC plug connector at a lower end of the lower section. With the smartphone so positioned, the sections can slide back together along the joint so as to plug the DC plug connector into the smartphone and enclose the smartphone within a phone compartment formed by the two sections. For example, such a sliding joint can include a portion of a rear housing panel comprised in one of the housing sections, which is slidingly retained in a complementary slot formed in the other housing section. The sliding joint can typically incorporate a stop to prevent further separation of the housing sections past a maximum clearance that is slightly longer than a portion of a charging case DC plug connector that protrudes upwardly into a lower end of a phone cavity formed by the phone compartment.

Thus, according to a method according to this disclosure, a user is able to charge an internal battery of a smartphone SP so retained in the phone compartment 41 without an external charging system, by using the internal charging system of the charging case 10. In particular, the user moves the AC power plug 15 to an extended position and plugs the AC prongs 66 into an AC electric socket energized by an AC power grid, to energize the charging case charging circuitry 70, so as to output the internal DC charging current to the DC output terminal 74, so that the internal DC charging current is delivered to the low-current DC wiring 79, through the low-current DC wiring 79 to the charging case DC plug connector 17, and through the charging case DC plug connector 17 to the smartphone DC charging socket to charge the internal battery of the smartphone SP.

Figure 7:
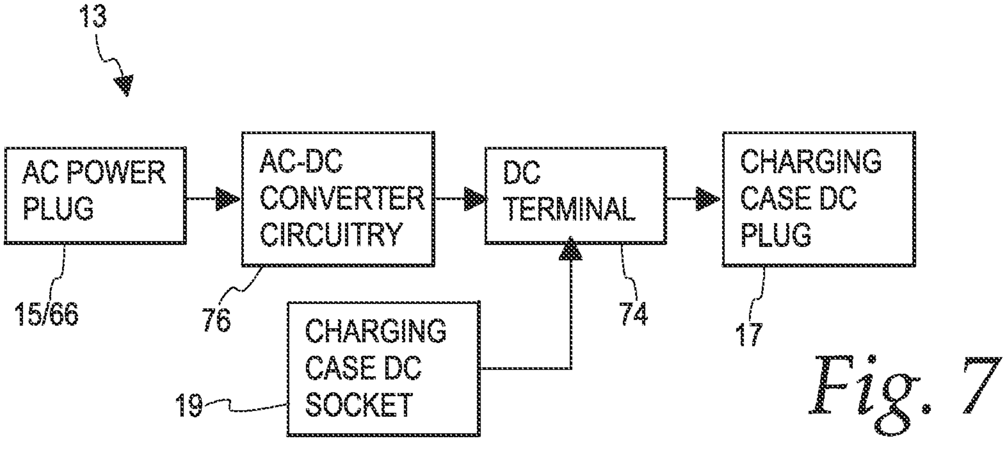
FIG. 7 is an illustrative block diagram of a charging case circuit of the charging case shown in FIG. 1.

In addition, the charging case 10 is further adapted and configured to facilitate charging the internal battery of a housed smartphone SP by any external charging system that is capable of doing so when connected directly to a DC socket of the smartphone SP, as follows. The charging case DC socket 19 is mounted to the housing 12 so as to permit an external DC plug connector of such an external charging system to be inserted into the charging case DC socket 19 from the exterior of the housing 12. The charging case DC socket 19 is operatively connected to the charging case DC plug connector 17, and so also to the DC output terminal 74, either directly or via the plug connector 17. For example, the socket 19 and plug connector 17 can be separate components, connected by wiring or other suitable conductive elements (not shown), or portions of a single integral component constructed so that the socket 19 is operatively connected to the plug connector 17. In view of the foregoing, it will be understood that the charging case DC socket 19 is operatively connected to the charging case DC plug connector 17 via an external charging system charging pathway 19, 74, 17, and the AC power plug 15/AC prongs 66 is/are operatively connected to the plug connector 17 via an internal charging system charging pathway 15/66, 76, 74, 17, as illustrated schematically in the block diagram of the charging case circuit 13 shown in FIG. 7, the internal charging system charging pathway being parallel to the external charging system charging pathway, so that a smartphone SP housed in the charging case 10 can be alternately charged by either mode according to a user's preference at the time of each charging.

Whether as parts of integral component or as separate, components operatively connected by wiring or other conductive element, the charging case DC plug connector 17 and the charging case DC socket 19 are mounted in the sidewall structure 40 so that the socket 19 faces an exterior opening of the housing 12 and the plug connector 17 extends into the phone cavity 52. More particularly, they are mounted in the sidewall structure bottom portion 44 so that the socket 19 extends downwardly to the bottom side 18 of the housing 12 and the plug connector 17 extends upwardly into a bottom side of the phone cavity 52.

It will be understood that, collectively, the charging case DC plug connector 17 and charging case DC socket 19 constitute a plug extender for an external DC plug connector plugged into the socket 19, together being operative to extend the operative connectivity and full functionality of the external DC plug connector to the DC plug connector 17. Conversely, the charging case DC plug connector 17 and charging case DC socket 19 constitute a socket extender for the DC charging socket of a housed smartphone SP, together being operative to extend the operative connectivity and full functionality of the smartphone DC charging socket to the charging case DC socket 19. The charging case DC socket 19 of the housed smartphone SP can therefore be used in the same ways as the DC charging socket of the smartphone SP itself. Thus, according to one method of using the charging case 10, an external DC plug connector (for example, a Lightning, micro-USB, USB C, or other standard data transfer connector) operatively connected to another electronic device is plugged into the charging case DC socket 19 for data transfer to or from the smartphone SP, from or to the other electronic device.

In another method, a smartphone SP housed in the phone compartment 41 of the charging case 10 can be charged using an external charging system for the smartphone SP. According to this method, a user plugs an external charging system DC plug connector into the charging case DC socket 19 and the external charging system is energized so as to deliver an external DC charging current to the external DC plug connector, and the charging case DC socket 19 receives and transmits the external DC charging current from the external DC plug connector to the charging case DC plug connector 17, which in turn transmits the external DC charging current to the smartphone DC charging socket to charge the internal battery of the smartphone SP.

It will be further appreciated that, according to a multi-mode charging method of using the charging case 10, the internal battery of the housed smartphone SP can be charged multiple times, including at least once by plugging the charging case 10 into an AC electric socket and at least once by plugging an external charging system into the charging case DC socket 19. It will be appreciated that a user may prefer a different charging mode under different circumstances. For example, a user may prefer to charge the smartphone SP without using an external charging system when the user does not have the external charging system available, prefers initiating charging by the single step of plugging in the charging case 10 itself over the two steps of plugging in the external charging system and then plugging the external DC plug connector into the charging case DC socket 19, prefers to minimize the presence of cords, and/or needs to free up an external charging system for charging another device. On the other hand, a user may prefer to charge the smartphone SP using an external charging system when the user needs to continue using the smartphone SP during charging, and/or when an external DC plug connector is easier to access than an AC electric socket, as for example when the external charging system is already connected to AC grid power, or when the external charging system is portable (for example, a charging cable connected to a portable power bank) and near at hand. Advantageously, the charging case DC socket 19 being operatively connected to the DC charging socket of the housed smartphone SP enables a user to select and/or switch between desired charging modes without having to remove the smartphone SP from the charging case 10.

The foregoing description of the disclosure has been presented for purposes of illustration and description and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A charging case for a smartphone with a DC charging socket, the charging case comprising:

a housing, the housing having rear, front, top, bottom, left and right sides, and dimensions, the housing dimensions being a depth dimension extending from a rear end on the rear side to a front end on the front side, a height dimension extending from a bottom end on the bottom side to a top end on the top side, and a width dimension extending from a left end on the left side to a right end on the right side, the housing comprising:

a rear panel disposed on the rear side;

a sidewall structure connected to the rear panel at a peripheral region of the rear panel, the sidewall structure extending forwardly from the rear panel to the front side, the sidewall structure comprising top and bottom portions and left and right lateral portions extending peripherally along respective portions of the rear panel perimeter on each of the left, bottom, right, and top sides of the housing;

a phone compartment, the phone compartment comprising at least a portion of the rear panel and at least a portion of each of the left, bottom and right portions of the sidewall structure, the phone compartment forming a phone cavity, the phone cavity being entirely disposed in front of the rear panel and within the dimensions of the housing;

a circuitry compartment, the circuitry compartment comprising at least a portion of the rear panel and at least a portion of each of the left, top and right portions of the sidewall structure, the circuitry compartment having an enclosed volume entirely disposed above the phone cavity and within the dimensions of the housing;

an AC power plug comprising a pair of AC prongs, the AC prongs being movably connected to the housing so as to be movable to and from a retracted position and an extended position, the AC prongs in the retracted position being disposed within the dimensions of the housing, and the AC prongs in the extended position extending beyond at least one dimension of the housing to permit the AC prongs be plugged into an AC electric socket energized by an AC power grid;

charging case charging circuitry disposed within the enclosed volume of the circuitry compartment, the charging case charging circuitry comprising an AC input terminal and a DC output terminal, the AC prongs being operatively connected to the AC input terminal so that when the AC prongs are plugged into the AC electric socket, AC grid power is delivered from the AC power grid through the AC prongs to the AC input terminal, the charging case charging circuitry being operative to be energized when the AC grid power is delivered to the AC input terminal, and when so energized, to output an internal DC charging current to the DC output terminal, the internal DC charging current being at a lower voltage than the AC grid power;

a charging case DC plug connector, the charging case DC plug connector being mounted to the sidewall structure and extending into the phone cavity;

low-current DC wiring, the low-current DC wiring operatively connecting the charging case charging circuitry DC output terminal to the charging case DC plug connector;

a charging case DC socket, the charging case DC socket being mounted to the housing so as to permit an external DC plug connector of an external charging system for the smartphone to be inserted into the charging case DC socket from the exterior of the housing, the charging case DC socket being operatively connected to the charging case DC plug connector, so that when the external DC plug connector is plugged into the charging case DC socket and the external charging system is energized so as to deliver an external DC charging current to the external DC plug connector, the charging case DC socket transmits the external DC charging current from the external DC plug connector to the charging case DC plug connector;

the phone compartment being operative to permit assembling the smartphone to the charging case by manually inserting the smartphone into the phone cavity in such a manner that the charging case DC plug connector is inserted into and operatively connected to the smartphone DC charging socket, and when the smartphone is so assembled to the charging case, the phone compartment being operative to hold the smartphone in the phone cavity so as to keep the charging case DC plug connector operatively connected to the smartphone DC charging socket, so that:

when the internal DC charging current is delivered to the charging case DC plug connector, the internal DC charging current is transmitted from the charging case DC plug connector to the smartphone DC charging socket; and when the external DC charging current is delivered to the charging case DC plug connector, the external DC charging current is transmitted from the charging case DC plug connector to the smartphone DC charging socket.

2. The smartphone charging case of claim 1 wherein the AC power plug is pivotally connected to the housing so as to be pivotable about a pivotal base to and from the retracted position and the extended position, the pivotal base being disposed at one of the sides of the housing and having a pivotal axis parallel to the side of the housing, the AC prongs in the retracted position extending away from the pivotal base towards an opposite side of the housing.

3. The smartphone charging case of claim 2 wherein the AC prongs in the extended position extend rearwardly away from the pivotal base beyond a rear extent of the housing.

4. The smartphone charging case of claim 3 wherein the extended position of the AC prongs is one of a plurality of extended positions of the AC prongs, the plurality of extended positions further including an additional extended position in which the AC prongs extend away from the pivotal base outwardly beyond a frontal profile area of the housing.

5. The smartphone charging case of claim 4 wherein the AC power plug in the retracted and plurality of extended positions is disposed above the phone compartment and pivotally connected to the top portion of the sidewall structure, the AC prongs in the additional extended position extending upwardly beyond the top side of the housing.

6. The smartphone charging case of claim 1 wherein the charging case DC socket is mounted to the bottom portion of the sidewall structure so as to permit the external DC plug connector to be upwardly inserted into the charging case DC socket at the bottom side of the housing.

7. The smartphone charging case of claim 1 wherein the charging case DC plug connector is mounted to the bottom portion of the sidewall structure so as to extend upwardly into the phone cavity.

8. The smartphone charging case of claim 3 further comprising at least one wiring channel formed in the sidewall structure, the wiring channel extending from the charging case DC plug connector, within an interior of the sidewall structure bottom portion to an interior of one of the right and left sidewall structure lateral portions, and through the interior of the sidewall structure lateral portion to the circuitry compartment, the low-voltage DC wiring extending from the charging case charging circuitry DC output terminal through the wiring channel to the charging case DC plug connector.

9. The smartphone charging case of claim 1 wherein the housing further comprises a divider wall, the divider wall being connected to and extending forwardly from the rear panel, the divider wall being disposed above the phone cavity and below the charging case charging circuitry.

10. The smartphone charging case of claim 1 wherein the housing further comprises at least one speaker/microphone aperture formed in the phone compartment, the speaker/microphone aperture having an inner opening adjacent the phone cavity and an outer opening adjacent the housing exterior, the speaker/microphone aperture being adapted and configured so that, when the smartphone is so assembled to the charging case, the inner opening exposes a speaker/microphone of the smartphone to the speaker/microphone aperture.

11. The smartphone charging case of claim 10 wherein the speaker aperture is formed in the bottom portion of the sidewall structure.

12. A method of charging an internal battery of a smartphone multiple times using a smartphone charging case, the smartphone charging case including a housing, the housing having rear, front, top, bottom, left and right sides, and dimensions, the housing dimensions being a depth dimension extending from a rear end on the rear side to a front end on the front side, a height dimension extending from a bottom end on the bottom side to a top end on the top side, and a width dimension extending from a left end on the left side to a right end on the right side, the housing including a rear panel disposed on the rear side, a sidewall structure connected to the rear panel at a peripheral region of the rear panel, the sidewall structure extending forwardly from the rear panel to the front side, the sidewall structure comprising top and bottom portions and left and right lateral portions extending peripherally along respective portions of the rear panel perimeter on each of the left, bottom, right, and top sides of the housing, a phone compartment, the phone compartment comprising at least a portion of the rear panel and at least a portion of each of the left, bottom and right portions of the sidewall structure, the phone compartment forming a phone cavity, the phone cavity being entirely disposed in front of the rear panel and within the dimensions of the housing, a circuitry compartment, the circuitry compartment comprising at least a portion of the rear panel and at least a portion of each of the left, top and right portions of the sidewall structure, the circuitry compartment having an enclosed volume entirely disposed above the phone cavity and within the dimensions of the housing, an AC power plug comprising a pair of AC prongs, the AC prongs being movably connected to the housing so as to be movable between a retracted position and an extended position, the AC prongs in the retracted position being disposed within the dimensions of the housing, and the AC prongs in the extended position extending beyond at least one dimension of the housing, charging case charging circuitry disposed within the enclosed volume of the circuitry compartment, the charging case charging circuitry comprising an AC input terminal and a DC output terminal, the AC prongs being operatively connected to the AC input terminal, the charging case charging circuitry being operative to be energized by input AC power delivered to the AC input terminal, and when so energized, to output an internal DC charging current to the DC output terminal, the internal DC charging current being at a lower voltage than the input AC power, a charging case DC plug connector, the charging case DC plug connector being mounted to the sidewall structure and extending into the phone cavity, low-current DC wiring, the low-current DC wiring operatively connecting the charging case charging circuitry DC output terminal to the charging case DC plug connector, a charging case DC socket, the charging case DC socket being mounted to the housing so as to permit an external DC plug connector to be inserted into the charging case DC socket from the exterior of the housing, the charging case DC socket being operatively connected to the charging case DC plug connector so that, when the external DC plug connector is plugged into the charging case DC socket and the external charging system is energized so as to deliver an external DC charging current to the external DC plug connector, the charging case DC socket transmits the external DC charging current from the external DC plug connector to the charging case DC plug connector, the method comprising:

manually inserting the smartphone into the phone cavity in such a manner that the charging case DC plug connector is inserted into and operatively connected to the smartphone DC charging socket, and so that the smartphone is retained by the phone compartment in the phone cavity so as to keep the charging case DC plug connector operatively connected to the smartphone DC charging socket;

when the smartphone is so retained in the phone compartment and it is desired to charge an internal battery of the smartphone without using an external charging system, moving the AC power plug to the extended position and plugging the AC prongs into an AC electric socket energized by an AC power grid to energize the charging case charging circuitry to output the internal DC charging current to the DC output terminal, so that the internal DC charging current is delivered to the low-current DC wiring, through the low-current wiring to the charging case DC plug connector, and through the charging case DC plug connector to the smartphone DC charging socket to charge the internal battery of the smartphone; and when the smartphone is so retained in the phone compartment and it is desired to charge an internal battery of the smartphone using an external charging system of the smartphone, connecting a DC plug connector of the external charging system to the charging case DC socket so that charging current from the external charging system is transmitted from the charging case DC socket to the charging case DC plug connector and from the charging case DC plug connector to the smartphone DC charging socket to charge the internal battery of the smartphone.

* * * * *